United States Patent
Wu

(10) Patent No.: US 7,840,996 B1
(45) Date of Patent: Nov. 23, 2010

(54) REMOTE DIRECTORY BROWSING THROUGH A SECURE GATEWAY OF A VIRTUAL PRIVATE NETWORK

(75) Inventor: Yuhua Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1147 days.

(21) Appl. No.: 11/498,684

(22) Filed: Aug. 3, 2006

(51) Int. Cl.
*G06F 17/00* (2006.01)
*G06F 12/00* (2006.01)

(52) U.S. Cl. .................. 726/15; 726/12; 726/13; 726/14; 707/828; 707/829; 707/830; 707/831

(58) Field of Classification Search .............. 726/15; 707/828–831
See application file for complete search history.

(56) References Cited

U.S. PATENT DOCUMENTS

| | | | | |
|---|---|---|---|---|
| 7,080,158 B1 * | 7/2006 | Squire | ................ | 709/245 |
| 2002/0083342 A1 * | 6/2002 | Webb et al. | ................ | 713/201 |
| 2002/0184527 A1 * | 12/2002 | Chun et al. | ................ | 713/201 |
| 2003/0061387 A1 * | 3/2003 | Brown et al. | ................ | 709/246 |
| 2005/0234983 A1 * | 10/2005 | Plastina et al. | ........... | 707/104.1 |
| 2005/0256955 A1 * | 11/2005 | Bodwell et al. | ............ | 709/224 |
| 2006/0041681 A1 * | 2/2006 | Rumelhart | ................ | 709/238 |
| 2007/0239732 A1 * | 10/2007 | Dixit et al. | ................ | 707/10 |

* cited by examiner

*Primary Examiner*—Taghi T Arani
*Assistant Examiner*—Thaddeus Plecha
(74) *Attorney, Agent, or Firm*—Shumaker & Sieffert, P.A.

(57) ABSTRACT

In general, techniques are described of enabling a client-based web browser application to browse a directory structure provided by a server on a private network via a secure gateway. In particular, an intermediate gateway device is positioned on a network path between the client device and a server device. The gateway device communicates with the client device via a secure network connection (e.g., a Secure Sockets Layer connection). When the gateway device receives a resource identifier that identifies a directory structure from either the client device or the server device, the gateway device alters the resource identifier. In particular, the gateway device alters the resource identifier in such a way that when the client device transmits a request to view the directory structure identified by the resource identifier, the client device transmits a request to view the directory structure in a networking protocol that the gateway device permits to pass through the gateway device.

16 Claims, 6 Drawing Sheets

REMOTE DIRECTORY BROWSING THROUGH A SECURE GATEWAY OF A VIRTUAL PRIVATE NETWORK

TECHNICAL FIELD

The invention relates to computer networks, and, in particular, to virtual private networks.

BACKGROUND

Organizations and individuals may use virtual private network (VPNs) to communicate securely over public networks. For example, an employee may use a virtual private network to communicate securely over the Internet with a computer at the office. The use of a VPN helps to guarantee that others on the public network cannot intercept, read, or reuse communications sent on the VPN.

In general, a remote client device establishes a VPN connection with a gateway device over a public network. The gateway device may include a firewall module to prevent unauthorized network packets from the public network from reaching a private network. Furthermore, the gateway device may include various security technologies, such a Secure Sockets Layer (SSL), to ensure that communications between the client device and the gateway device are secure. After the client device establishes a VPN connection with the gateway device, the gateway device may allow network packets from the client device to pass through the gateway device a server device on a private network, and vice versa. In this way, the client device may securely interact with the server device.

Some gateway devices routinely prevent network packets that do not conform to a specific protocol from passing through the gateway device. For example, a gateway device may block all network packets that do not conform to the Hypertext Transfer Protocol security (https) protocol. In such a situation, a client device cannot send a network packet through the gateway device when the network packet conforms to another protocol, such a Server Message Block (SMB). This can cause problems for certain applications that, by default, use the other protocol.

SUMMARY

In general, the invention relates to techniques of enabling a client-based web browser application to browse a directory structure provided by a server device on a private network via a secure gateway. In one example, an intermediate gateway device is positioned on a network path between the client device and a server device. The gateway device communicates with the client device via a secure network connection (e.g., a Secure Sockets Layer connection). When the gateway device intercepts a resource identifier that identifies a directory structure provided by the server device, the gateway device alters the resource identifier. In particular, the gateway device alters the resource identifier in such a way that when the client device transmits a request to view the directory structure identified by the altered resource identifier, the client device automatically transmits a request to view the directory structure in a networking protocol that the gateway device permits to pass through the gateway device and that is supported by the backend server providing the resource.

For example, a web browser application on a client device may establish a virtual private network (VPN) connection by authenticating to a VPN gateway device. To browse a remote directory structure provided by a directory server protected by the VPN gateway device, a user of the web browser application may click on a link containing a resource identifier of the directory structure formatted in the Universal Naming Convention (UNC). In response to the click, the web browser application sends a request from the client device to the directory server in a first protocol. However, before the request arrives at the directory server, the VPN gateway device intercepts the request and responds to the request with an alternative web page. This alternative page contains instructions that cause the web browser application to send a second request and an altered form of the resource identifier to display the same directory structure but in the form of a second graphical directory-browsing user interface. The VPN gateway device forwards the second request to the backend device. Subsequently, the directory server responds with the requested directory structure in the second graphical directory-browsing user interface that is compatible with the VPN connection. The VPN gateway then provides the HTTP response(s) to the web browser application of the client device to present the browsable directory structure.

In one embodiment, a method is performed by an intermediate computer network device providing a secure virtual private network (VPN) connection between a client device and a server. The method comprises intercepting, with the intermediate device, an original resource identifier communicated between the client and the directory server via the VPN. The original resource identifier identifies a directory structure provided by the server, and conforms to a format that causes the directory server to produce the directory structure in a first graphical, directory-browsing user interface that is incompatible with the VPN connection between the client device and the server. The method further comprises, in response to the intercepted original resource identifier, sending a web page from the intermediate device to the web browser application on the client device via the secure VPN connection. The web page contains an altered resource identifier and instructions to cause the client device to output a request for the same directory structure but in a second, graphical directory-browsing user interface that is compatible with VPN connection between the client device and the server.

In another embodiment, a virtual private network (VPN) gateway device comprises a plurality of network interfaces, and a processor. The processor executes software instructions that cause the VPN gateway device to intercept an original resource identifier communicated between a client and a directory server via a VPN connection provided by the VPN gateway device. The original resource identifier identifies a directory structure provided by the server. The original resource identifier conforms to a format that causes the directory server to output the directory structure in a first graphical, directory-browsing user interface that is incompatible with the VPN connection between the client device and the server. The instructions also cause the VPN gateway device to, in response to the intercepted original resource identifier, send a web page from the intermediate device to the client device via the secure VPN connection. The web page contains an altered resource identifier and instructions to cause the client device to request the same directory structure in a second, graphical directory-browsing user interface that is compatible with VPN connection between the client device and the server.

In another embodiment, a computer-readable medium contains instructions. The instructions cause a programmable processor to receive an original resource identifier that identifies a directory structure, wherein, if the original resource identifier were received by a directory server, the directory server would generate a response that would cause a web browser application on a client device to display a directory structure in a first graphical directory-browsing interface. The computer-readable medium also comprises instructions to cause the processor to send a web page to the web browser application on a client device via a secure virtual private network connection in response to receiving the resource identifier, wherein the web page contains instructions to cause the web browser application to send a request to display the directory structure in a second graphical directory-browsing interface.

In another embodiment, an intermediate network device is positioned on a network path between a client device and a directory server. The network device comprises a first network interface to send and receive network packets to and from the intermediate network device and the client device over a public network via a connection protected with transport layer security. The intermediate network device also comprises an interface control module to identify a first request to view a directory structure provided by the directory server, wherein the first request conforms to a protocol that the intermediate network device does not permit to pass through the intermediate network device, and wherein the first request is a request to view a directory structure in a first graphical directory-browsing interface. In addition, the intermediate network device comprises a response synthesis module to generate a response that causes a web browser application on a client device to send a second request to view a directory structure provided by the directory server, wherein the second request conforms to a protocol that the intermediate network device permits to pass through the intermediate network device, and wherein the second request is a request to view a directory structure in a second graphical directory-browsing interface.

In another embodiment, the intermediate network device comprises a first network interface to send and receive network packets to and from the intermediate network device and the client device over a public network via a connection protected with transport layer security. In addition, the intermediate network device comprises a second network interface to send and receive network packets to and from the intermediate network device and the directory server. The intermediate network device also includes an interface control module to identify a response to a request to view a directory structure provided by the directory server, wherein the response contains an original resource identifier that, if used by a web browser application on the client device, would cause the web browser application to send a request in a protocol that the intermediate network device does not permit to pass through the intermediate network device, and would cause the web browser application to request to view the directory structure in a first graphical directory-browsing interface. Further, the intermediate network device includes a rewriting module to generate a rewritten response in which the original resource identifier has been disabled and which includes, in place of the original resource identifier, a replacement resource identifier, wherein if the replacement resource identifier is used by the web browser application, the web browser application would generate a second request to view the directory structure in a protocol that the intermediate network device permits to pass through the intermediate network device, and wherein the second request is a request to view the directory structure in a second graphical directory-browsing interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
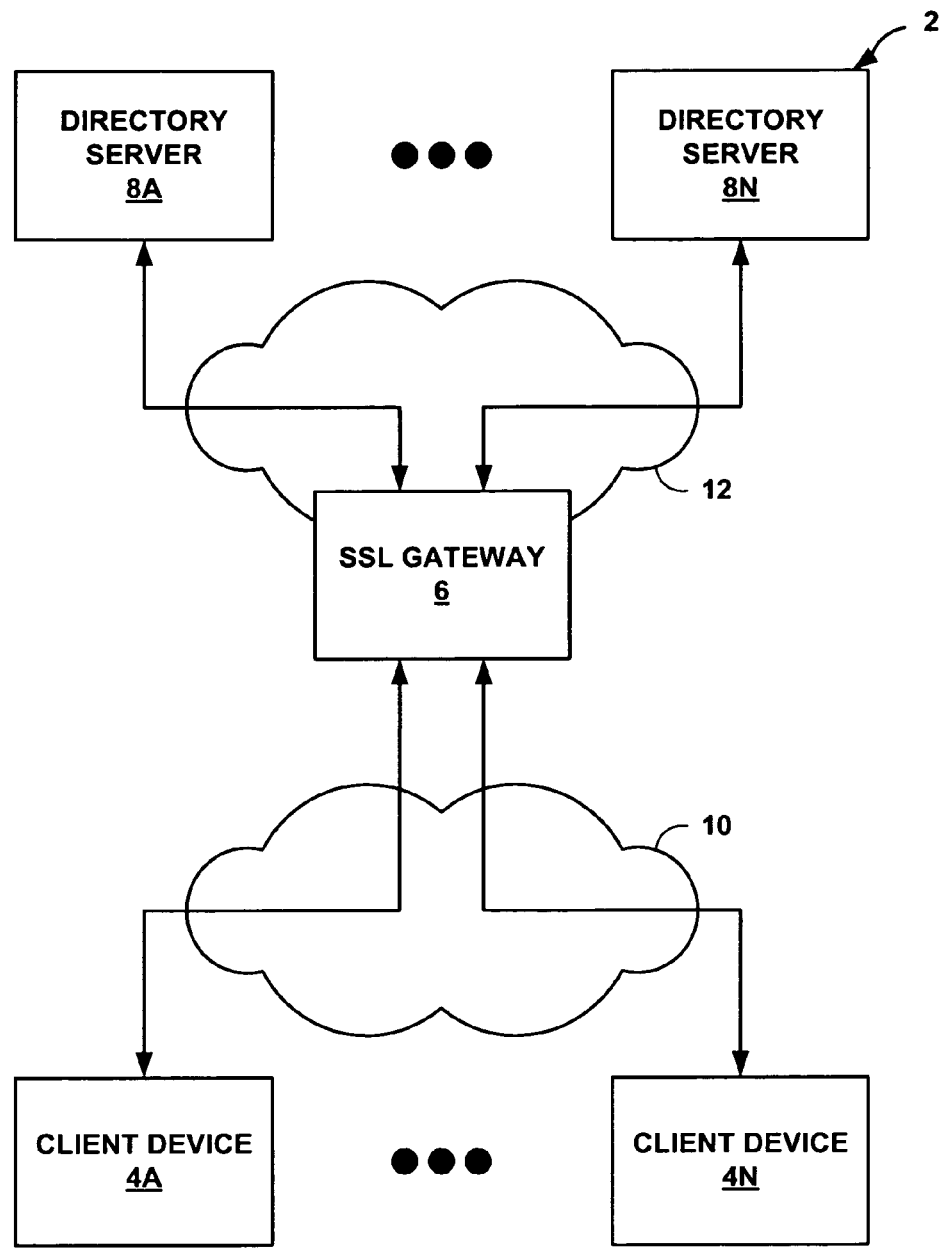
FIG. 1 is a block diagram illustrating an exemplary system in which a client device displays a directory structure delivered via a secure sockets layer virtual private network (SSL VPN).

FIG. 1 is a block diagram illustrating an exemplary system 2 in which a client device may display a directory structure delivered via a secure sockets layer virtual private network (SSL VPN). In particular, system 2 includes client devices 4A through 4N (collectively, client devices 4). In addition, system 2 includes a Secure Sockets Layer (SSL) Virtual Private Network (VPN) gateway 6, and directory servers 8A through 8N (collectively, directory servers 8). A public network 10 facilitates communication between client devices 4 and gateway 6 and a private network 12 facilitates communication between gateway 6 and directory servers 8.

An enterprise may utilize system 2 to enable its employees to work remotely. For example, client devices 4 may be personal computers associated with individual employees. If these employees are working away from the office, these employees may wish to browse directories and files provided by Microsoft SharePoint servers operating on directory servers 8. For instance, an employee may wish to browse directories to find a word processing document. To facilitate remote access to its electronic resources, the enterprise utilizing system 2 sets up gateway 6 to provide secure communication channels through public network 10 (e.g., the Internet). After the enterprise sets up gateway 6, employees using client devices 4 use the secure communication channels provided by gateway 6 to browse the directories and files provided by directory servers 8. In this way, the enterprise enables its employees to work remotely.

For security reasons, gateway 6 does not permit network packets from public network 10 to pass through gateway 6 to devices attached to private network 12 except under certain conditions. To help prevent network packets from public network 10 from passing through gateway 6, gateway 6 may disable or "block" certain network ports. This may effectively block network packets conforming to certain network protocols. This technique may be useful because certain types of network attack are associated with certain ports. For instance, the "Sasser" worm that disrupted computer networks in 2004 uses port 445. To minimize the risk that a network attack or other security threat may compromise private network 12, an administrator may configure gateway 6 to block as many ports and protocols as possible.

However, the fact that certain legitimate network packets are associated with certain ports and protocols limits the administrator's ability to configure gateway 6 to block ports and protocols. According to convention, each port is associated with one or more networking protocols. For example, the Hypertext Transfer Protocol (HTTP) over Transport Control Protocol (TCP) is associated with port 80, File Transport Protocol (FTP) is associated with port 20, and so on. Furthermore, Server Message Block (SMB) protocol over User Datagram Protocol (UDP) is associated with port 445. Thus, if gateway 6 is configured to block port 445 to prevent the "Sasser" worm, gateway 6 also blocks legitimate SMB protocol traffic.

Applications frequently use SMB to browse directories and files. For example, client device 4A may use SMB to exchange information about directory structures over a network with a Microsoft SharePoint server application operating on server device 8A. Client device 4A may use this directory structure information to display a directory structure within a graphical directory-browsing interface such as Windows Explorer. The ability to browse a directory structure over a network makes the experience of working remotely more similar to the experience of working from a client device within the office.

However, a difficulty arises if gateway 6 blocks port 445 to forestall network attacks. In particular, the client device and the directory server device may not be able to exchange network packets conforming to the SMB protocol because the SMB protocol uses the blocked port 445. Consequently, the client device may not be able to receive the directory structure information needed to display the directory structure provided by directory servers 8.

In one solution to this difficulty, the client devices 4 and directory servers 8 may be limited to applications that only exchange directory information in a protocol that is associated with a port on gateway 6 that is not blocked. For instance, if port 80 (the port associated with HTTP) is not blocked, client device and the directory server may be able to use HTTP to exchange directory structure information. However, limiting the software applications and formats that may be used on the client device may present additional problems. For instance, the client device may be configured to send requests for directory structure information in network packets conforming to SMB by default. In an additional problem, SMB and HTTP utilize different resource identifier schemes to identify resources. In particular, SMB utilizes the Universal Naming Convention (UNC) scheme while HTTP utilizes the Universal Resource Locator (URL) scheme. In general, the UNC scheme uses two backslashes to start a resource identifier and additional backslashes to separate directories. For example, "\\hostname.com\shared_directory\filename" is a valid UNC resource identifier. On the other hand, the URL scheme uses a protocol name followed by a colon and two forward slashes to start a resource identifier and additional forward slashes to separate directories. For example, "https://hostname.com/shared_directory/filename" is a valid URL resource identifier. In general, an HTTP request containing a UNC resource identifier would be invalid, and vice versa. A proper solution must overcome these problems.

In accordance with the principles of this invention, an administrator may configure gateway 6 to overcome these problems. For example, when gateway 6 intercepts original resource identifiers communication between the client device 4 and the directory servers 8 that identifies a directory structure provided by the servers, and wherein the original resource identifier conforms to a format that causes the directory server to produce the directory structure in a first graphical, directory-browsing user interface that is incompatible with the VPN connection between the client devices and the servers. That is, servers 8 would output the first graphical, directory-browsing user interface by a protocol or port not permitted by gateway 6 in associated with the secure VPN connection.

In response to the intercepted original resource identifier, gateway 6 sends a web page to the software applications (e.g., web browser applications) on the client devices 4 via the secure VPN connections. The web page contains an altered resource identifier to the same directory structure and instructions to cause the client devices to automatically request the same directory structure in a second, graphical directory-browsing user interface that is compatible with VPN connection between the client devices and the directory servers.

For example, gateway 6 may receive a SMB request from a client device (e.g., client device 4A) to browse a directory structure provided by a directory server (e.g., directory server 8A), gateway 6 intercepts the request and does not forward the request to directory server 8A. Rather, gateway 6 sends a synthesized response to client device 4A, where the synthesized response contains an altered identifier for the same directory structure but where the identifier is in a different format. Upon receiving the synthesized response from gateway 6, client device 4A automatically executes instructions, which cause client device 4A to send a formatted HTTP request to gateway 6 to browse the directory using the altered resource identifier. Gateway 6 may then forward the HTTP request and the altered resource identifier to directory server 8A. Subsequently, gateway 6 transmits an HTTP response containing directory information from directory server 8A to client 4A in a protocol supported by gateway 6 and appropriate for the VPN connection. In this manner, the altered resource identifier causes the directory server 8A to output the directory structure information in a graphic user interface that is compatible with the VPN connection between the client and the server.

After receiving the HTTP response, client device 4A may display the directory information contained in the HTTP response in a web browser in a way that looks and feels like a display of directory information used by the operating system of client device 4A. That is, the web browser on client device 4A generates a display of the directory structure in a manner that replicates a style of a directory structure that is native to an operating system on which the web browser is executed. In the case where the web browser is Microsoft Internet Explorer operating on Microsoft Windows, client device 4A may display the directory information is a manner that replicates the look and feel of a display of a directory structure in Windows Explorer. In this way, gateway 6 may allow a user of a remote computer to securely access a directory structure in a manner that is consistent with the manner the user accesses the directory structure from a computer at the office.

The principles of this invention may present one or more advantages. In particular, the principles of this invention may enhance productivity and satisfaction of employees who are working remotely by providing a familiar means by which the employees may access directories and files. In particular, employees may use software applications use UNC-formatted resource identifiers to identify directories and files when the employees are located on site or at a remote location. It is not necessary that the employees click on predefined links or otherwise to access the directory structures and files provided by the directory server. In addition, there may be no need for the employees to download or install any additional software to their client devices.

At the same time, the principles of this invention may allow the enterprise to maintain a secure virtual private network by blocking network traffic on as many ports as possible. The principles of this invention may also aid the enterprise by eliminating the need to preprogram mappings between UNC-formatted resource identifiers and URL-formatted resource identifiers.

It should be understood that the principles of this invention are not limited to the examples provided above. For instance, client devices 4 may be web-enabled telephones, set-top boxes, intermediate network devices, web appliances, personal digital assistants, video gaming platforms, digital video recorders, or other web-enabled devices or appliances. In addition, public network 10 may represent a network other than the Internet. For example, public network 10 may be any computer network through with an enterprise or individual wishes to establish secure communication channels capable of carrying traffic associated with the World Wide Web. For instance, public network 10 could be an unsecured wireless network. Furthermore, gateway 6 may use a technology other than SSL, such as Transport Layer Security (TLS), to establish secure VPN connections through public network 10.

Figure 2:
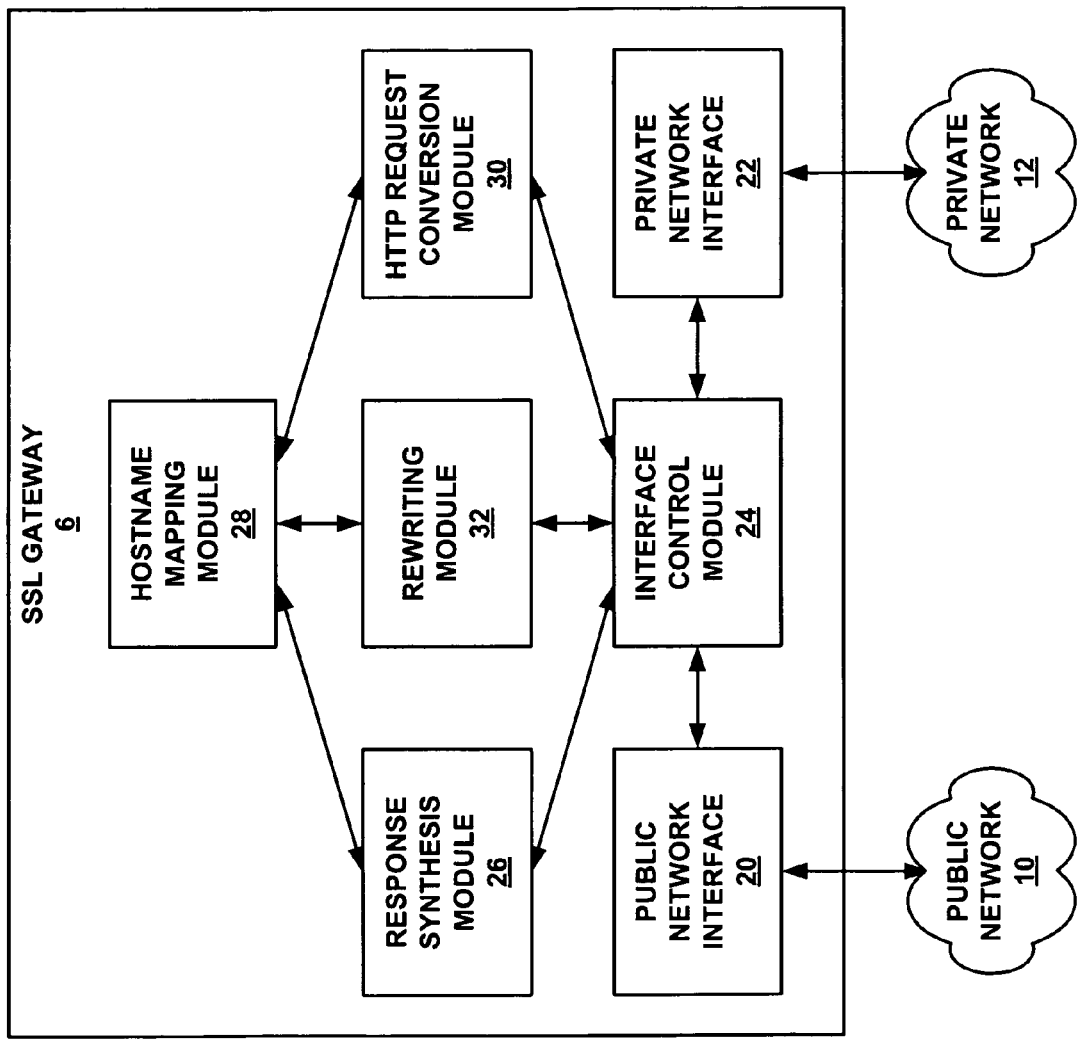
FIG. 2 is a block diagram illustrating an exemplary embodiment of a SSL VPN gateway.

FIG. 2 is a block diagram illustrating an exemplary embodiment of a secure sockets layer virtual private network gateway. For purposes of explanation, continuing reference is made to one or more items from FIG. 1. As illustrated in FIG. 2, gateway 6 includes a public network interface 20 and a private network interface 22. Public network interface 20 facilitates communication between components of gateway 6 and devices (such as client device 4A) attached to public network 10. Similarly, private network interface 22 facilitates communication between components of gateway 6 and devices (such as directory servers 8) attached to private network 12. In this exemplary embodiment, public network interface 20 and private network interface 22 may be of the same or different type. For example, either or both of public network interface 20 and private network interface 22 may be Ethernet, fiber optic, wireless, token ring, modem, cable, or other interfaces.

To browse a directory structure, an employee may access a VPN portal page of the enterprise generated and provided by gateway 6. This portal page may be an HTML page displayed by the web browser application on client device 4A. The portal page may include a text field in which the employee may enter a UNC-formatted resource identifier. For instance, the employee may enter the UNC-formatted resource identifier \\directory_HN.com\shared_directory\ in this text field to view the shared_directory directory on a directory server having a hostname directory_HN.com. In addition, the portal page may include one or more directory browsing links. The targets of each of these links are resources identified by UNC-formatted resource identifiers. For example, <a href="\\directory_HN.com\shared_directory\">Browse Shared Directory</a> is an HTML representation of a link in the portal page that has a target resource identified by a UNC-formatted resource identifier. When the employee enters a UNC-formatted resource identifier in the text field or clicks on one of the links on the portal page, the web browser application may send a request in the SMB protocol with the UNC-formatted resource identifier.

In system 2, gateway 6 is positioned on the exclusive path between public network 10 and private network 12. Hence, when the SMB request is addressed to directory server 8, gateway 8 is positioned to intercept and manipulate the SMB request. For example, public network interface 20 of gateway 8 may receive a network packet containing the SMB request from client device 4A.

Upon receiving a network packet from public network 10, public network interface 20 forwards the network packet to an interface control module 24. Interface control module 24 determines whether the network packet is a last packet of an SMB request. If the request is a last packet of an SMB request, interface control module 24 sends the SMB request to a response synthesis module 26.

Response synthesis module 26 generates a response that, in one embodiment, includes a web page. This web page contains instructions to cause a web browser application to send a request to display the directory structure in a second graphical directory-browsing interface. For example, the web page may include an HTML <style> element that adds the Anchor-Click behavior to each HTML <a> element. In Microsoft Internet Explorer, the AnchorClick behavior enables folder viewing in a graphical user interface that resembles the graphical user interface for directory browsing of the Microsoft Windows Operating System.

In a cookie-based embodiment, response synthesis module 26 sets a cookie on client device 4A to preserve a hostname of destination server. Response synthesis module 26 may either set the cookie by including a set-cookie instruction in a HTTP response or by including scripting instructions in the synthesized web page that set the cookie. For example, in the cookie-based embodiment that uses the scripting to set the cookie, response synthesis module 26 may generate a synthesized web page that contains the following Hypertext Markup Language (HTML) code:

<html>
    <STYLE>A    {behavior:url(#default#AnchorClick);}</STYLE>
    <A id=folderview HREF=""
    FOLDER="http://gateway_HN.com/test/"
    TARGET="_top"
    >
    <script>
    document.cookie=SetCookie
      ("dest_HN=destination_HN");
    folderview.click( );
    </script>
    </A>
    </html>

When the web browser application loads this page, the web browser application automatically executes instructions in the <script> element. In this exemplary web page, the instructions cause the web browser application to set the cookie and then to behave as though a user had clicked on the anchor listed above. If the web browser application supports the "AnchorClick" behavior (e.g., Microsoft Internet Explorer 4.0 and above), the web browser application sends a HTTP request to display a directory structure at "http://gateway_HN.com/test/". This HTTP request includes the cookie containing the hostname of the directory server. When the web browser application receives directory information in response to the HTTP request, the web browser application displays a directory structure in a "folder view" graphical directory-browsing interface. The folder view interface is consistent in style and behavior with a graphical directory-browsing interface used by an operating system that runs Internet Explorer.

In a hostname encoding embodiment, response synthesis module 26 supplies the hostname listed in the SMB request to a hostname mapping module 28. Hostname mapping module

28 applies a template encoding scheme to internally map between the hostname in the SMB request and an encoded version of the hostname. In this way an administrator need not be required to statically configure a mapping. Moreover, a unique hostname can be presented for each backend application, and the encoded hostname represents the original hostname as well identifies the backend software application.

The encoding scheme may be applied to a dynamic transformation of UNC directory links or to universal resource locators (URLs). In one embodiment, the encoded version does not include any dots "." and may be used as a prefix in a hostname of gateway 6.

As described in greater detail below, when gateway 6 receives an HTTP request having a hostname with an encoded version as a prefix, gateway 6 may dynamically reconstruct the original hostname and identify the backend application. For example, in this hostname encoding embodiment, response synthesis module 26 may generate the following web page:

```
<html>
<STYLE>A {behavior: url(#default#AnchorClick);}</STYLE>
<A id=folderview HREF=""
FOLDER="http://encoded_HN.gateway_HN.com/test/"
TARGET="_top">
<script>
folderview.click( )
</script>
</A>
</html>
```

After response synthesis module 26 generates the synthesized page, interface control module 28 forwards the synthesized page to public network interface 20 for transmission via public network 10 to client device 4A. When client device 4A receives the synthesized response, the web browser application executing on client device 4A handles the response as it would for a normal response. In handling the response, the web browser application attempts to display the web page included in the response. In attempting to display the web page, the web browser application automatically executes the scripts embedded in the web page. These scripts contain instructions that cause the web browser application to generate an HTTP request to view the directory structure.

Subsequently, public network interface 20 may receive a network packet from client device 4A. Public network interface 20 forwards this network packet to interface control module 24. When interface control module 24 determines that the network packet is a last packet of an HTTP request containing a hostname of gateway 6, interface control module 24 forwards the HTTP request to a HTTP request conversion module 30.

HTTP request conversion module 30 changes the hostname portion of the HTTP request from a hostname of gateway 6 to a hostname of directory server 8A. In the first embodiment mentioned above, HTTP request conversion module 30 examines a cookie embedded in the HTTP request. This cookie includes the hostname of directory server 8A. In the hostname encoding embodiment mentioned above, HTTP request conversion module 30 uses the hostname portion of the HTTP request to invoke hostname mapping module 28. Hostname mapping module 28 responds by providing HTTP request conversion module 30 with a hostname of directory server 8A. After discovering the hostname of directory server 8A, HTTP request conversion module 28 modifies the HTTP request to include the hostname of directory server 8A. For example, suppose HTTP request conversion module 28 receives the following HTTP request:

GET/shared_directory/HTTP/1.1

Host: encoded_directory_HN.gateway_hostname.com

In this example, HTTP request conversion module 28 may return the following modified HTTP request to interface control module 24:

GET/shared_directory/HTTP/1.1

Host: directory_HN.com

When interface control module 24 receives the modified HTTP request from HTTP request conversion module 28, interface control module 24 forwards the HTTP request to private network interface 22 for transmission to directory server 8 via private network 12.

Private network interface 22 may receive network packets from directory servers 8. When private network interface 22 receives a network packet, private network interface 22 forwards the network packet to interface control module 24. Upon receiving the network packet, interface control module 24 determines whether the network packet constitutes a last packet of an HTTP response. If so, interface control module 24 provides the HTTP response to a rewriting module 32.

Rewriting module 32 rewrites the HTTP response to disable the original resource identifiers in the HTTP response. In addition, rewriting module 32 rewrites the HTTP response to contain the instructions to cause the web browser on the client device to display the directory structure in the folder view interface.

For example, suppose the HTTP response includes the following hyperlink:

<a href="\\directory_hostname.com\shared_dir\">

In the cookie-based embodiment described above, rewriting module 28 may rewrite the HTTP response as follows:

HTTP/1.1 200 OK

Set-Cookie: dest_hostname=directory_HN.com

Content-type: text/html

. . . //other header and HTML data// . . .

<a href=""style="behavior:url('#default#httpFolder')"

onClick="javascript:navigateFrame('gateway_HN.com/shared_dir', '_top')"

>

This rewritten HTTP response includes an additional line in the HTTP header to set a cookie on client device 4A. In particular, the Set-Cookie line of the HTTP header establishes a value pair dest_hostname=directory_HN.com. Subsequently, HTTP request conversion module 30 may use this value pair to reconstruct the directory server hostname of a HTTP request. The rewritten HTTP response also includes a rewritten version of the hyperlink. In this rewritten version of the hyperlink, the original resource identifier is disabled because rewriting module 32 has removed the value for the href attribute. Rather, the rewritten version of the hyperlink now includes the httpFolder behavior that enables the folder view graphical directory-browsing interface in Microsoft Internet Explorer web browsers. This rewritten hyperlink also includes a JavaScript function to launch the navigateFrame function to view the directory structure at gateway_HN.com/shared_dir in the '_top' window.

In the hostname encoding embodiment described above, rewriting module 32 may rewrite the HTTP response as follows:

HTTP/1.1 200 OK

Content-type: text/html

. . . //other header and HTML data// . . .

<a href=""

style="behavior:url('#default#httpFolder')"

onClick="javascript:

navigateFrame('encoded_directory_HN.gateway_HN.com/shared_dir', '_top')"

>

Note that in this version, the rewritten HTTP response does not set a cookie on the client device. However, this version includes a JavaScript function to launch the navigateFrame function to view the directory structure at encoded_directory_HN.gateway_HN.com in the folder view graphical directory-browsing interface. Subsequently, when gateway 6 receives a HTTP request having this hostname, HTTP request conversion module 28 may use encoded_directory_HN to reconstruct the directory server hostname.

To summarize and generalize the example, a process starts when gateway 6 receives an original resource identifier that identifies a directory structure. This original resource identifier may, for example, be in the HTTP response from directory servers 8 or be in the SMB requests from client devices 4. In either case, if directory servers 8 were to receive the original resource identifier back, directory servers 8 would respond with information that would cause the client devices to display the directory structure in the Windows Explorer graphical directory-browsing interface. However, gateway 6 intervenes by sending a web page to the web browser application on the client device via a secure virtual private network connection in response to receiving the original resource identifier. This web page contains instructions to cause the web browser application to send a request (i.e., the HTTP request). The HTTP request is a request to display the directory structure in a second graphical directory-browsing interface (e.g., the "folder view" graphical directory-browsing interface within Microsoft Internet Explorer.)

Figure 3:
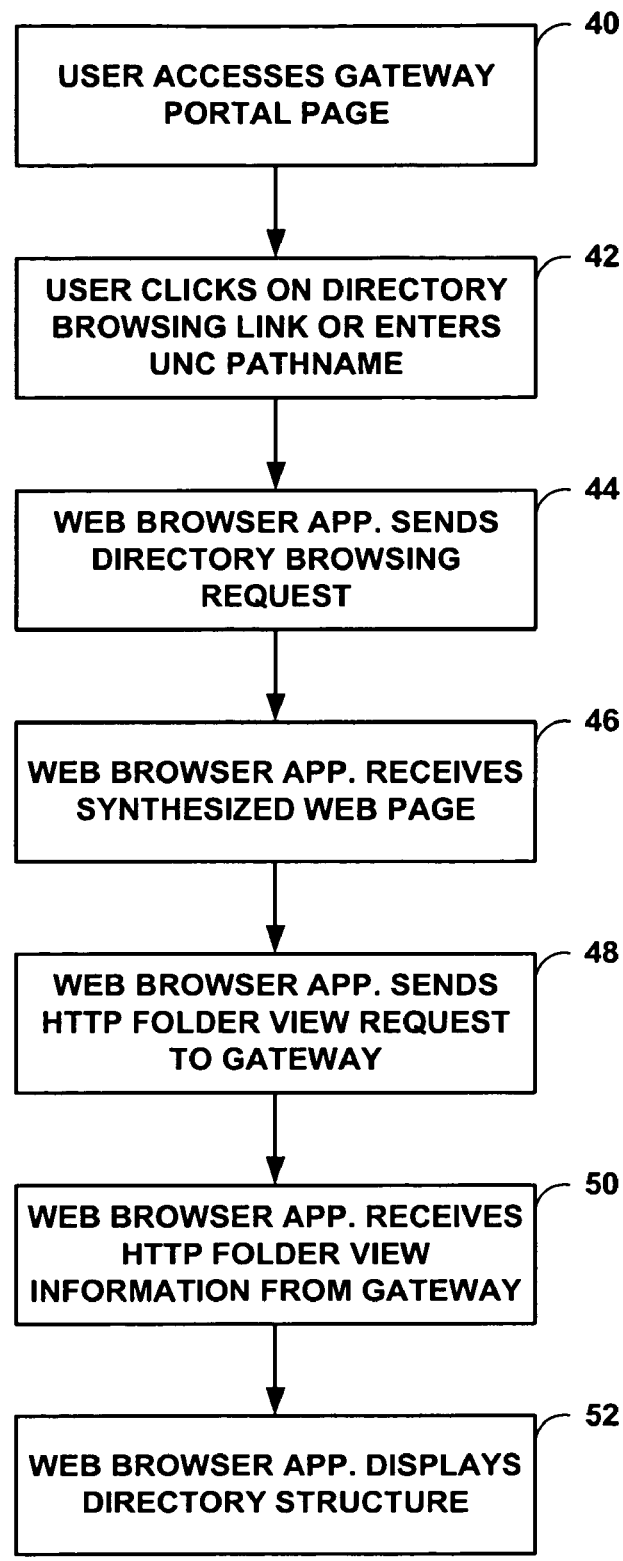
FIG. 3 is a flowchart illustrating an exemplary operation of a client device when interacting with a SSL VPN gateway device configured to facilitate directory browsing.

FIG. 3 is a flowchart illustrating an exemplary operation of a client device when interacting with a SSL VPN gateway device configured to facilitate remote directory browsing through a VPN. For purposes of illustration, continuing reference is made to FIG. 2. In this exemplary operation, a user of a web browser application on a client device (e.g., client device 4A) accesses a gateway portal page provided by gateway 6 (40). To view a directory structure, the user may click on a directory browsing link on the gateway portal page or enter a UNC-formatted resource identifier in a text field on the gateway portal page (42). When the user clicks on a directory browsing link or enters the UNC-formatted resource identifier, the web browser application sends a directory browsing request in the SMB protocol containing the UNC-formatted resource identifier (44).

Subsequently, the web browser application receives a synthesized web page from gateway 6 in response to the SMB request (46). When the web browser application receives this synthesized page, the web browser application automatically executes scripts contained in the response that cause the web browser application to send to gateway 6 a HTTP folder view request to view the directory structure (48). This HTTP request contains a URL-formatted resource identifier.

After sending the HTTP request, the web browser application may receive a HTTP response from gateway 6 containing information about the directory structure named by the resource identifier (50). The web browser application may then use the information to display the directory structure (52).

Figure 4:
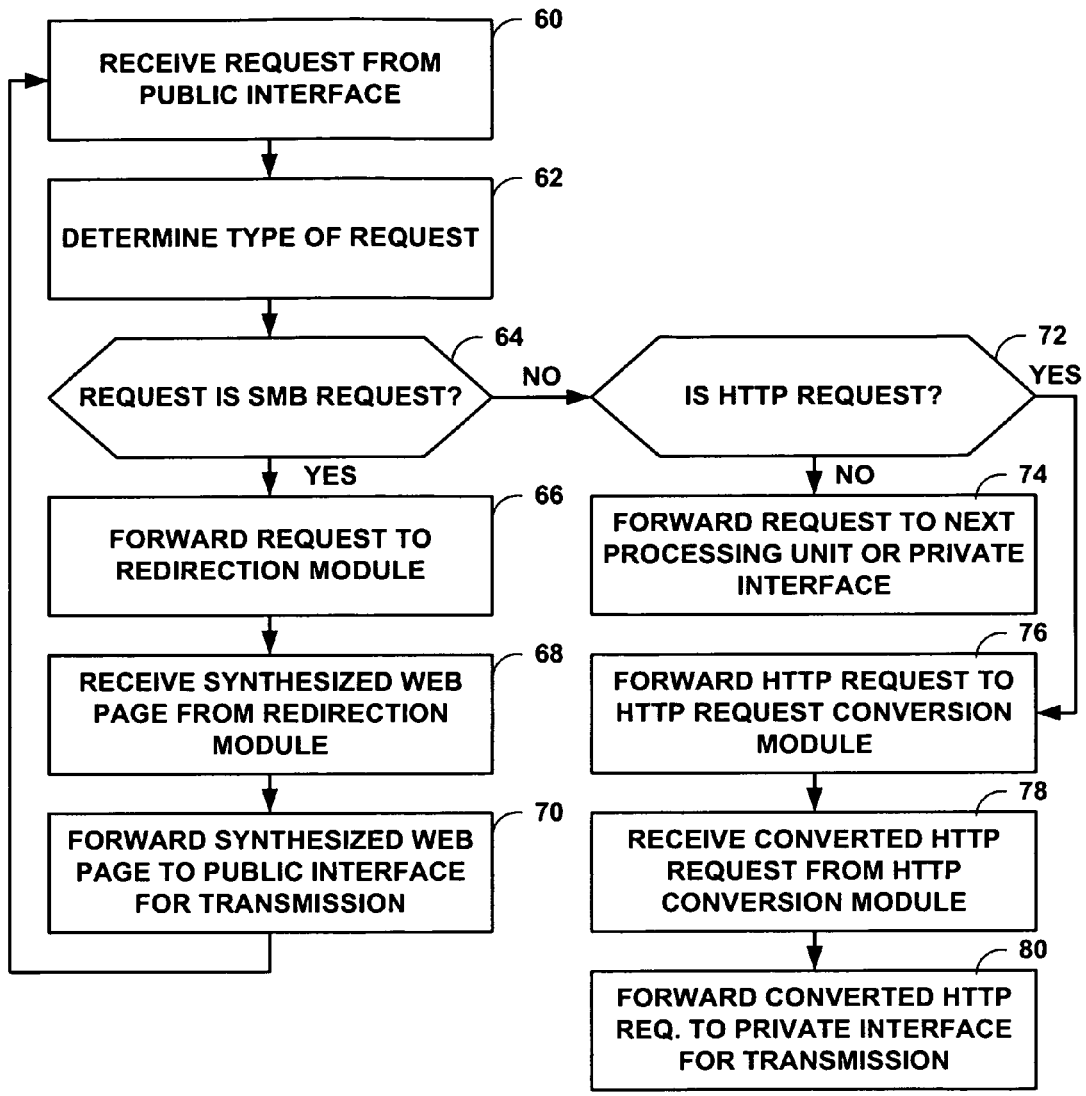
FIG. 4 is a flowchart illustrating an exemplary operation of an interface control module within a SSL VPN gateway device configured to facilitate directory browsing when the SSL VPN gateway device receives a packet from a client device.

FIG. 4 is a flowchart illustrating an exemplary operation of an interface control module within an SSL VPN gateway device configured to facilitate directory browsing when the SSL VPN gateway device receives a network packet from a client device. For purposes of illustration, continuing reference may be made to the previous figures.

Initially, interface control module 24 within gateway 6 receives a network packet from private network interface 20 (60). Upon receiving the network packet, interface control module 24 determines the type of network packet (62). If interface control module 24 identifies the network packet as a last network packet of an SMB request ("YES" of 64), interface control module 24 forwards the completed SMB request to response synthesis module 26 (66). Subsequently, interface control module 24 receives a synthesized response from response synthesis module 26 (68). As discussed above, in creating the synthesized response, response synthesis module 26 may send the hostname listed in the SMB request to hostname conversion module 28 for dynamic mapping. After response synthesis module 26 generates the synthesized response, interface control module 24 forwards the synthesized response to public network interface 20 for transmission through public network 10 to client device 4A (70).

On the other hand, if interface control module 24 does not identify the network packet as a last network packet of an SMB request ("NO" of 64), interface control module 24 determines whether the network packet is a last network packet of an HTTP request (72). For instance, interface control module 24 may receive an HTTP request resulting from the synthesized response. If the network packet is not a last packet of an HTTP request ("NO" of 72), interface control module 24 may buffer the network packet, forward the network packet to another processing module in gateway 6 (e.g., an intrusion detection module) or may simply forward the network packet to private network interface 22 for transmission to private network 12 (74). However, if the network packet is a last packet of an HTTP request ("YES" of 72), interface control module 24 forwards the HTTP request to HTTP request conversion module 30 (76). Subsequently, interface control module 24 receives a converted HTTP request from HTTP request conversion module 30 (78). As discussed above, this converted HTTP request now has the hostname of the directory server. After interface control module 24 receives the converted HTTP request from HTTP request conversion module 30, interface control module 24 forwards the converted HTTP request to private network interface 22 for transmission to the directory server via private network 12 (80).

Figure 5:
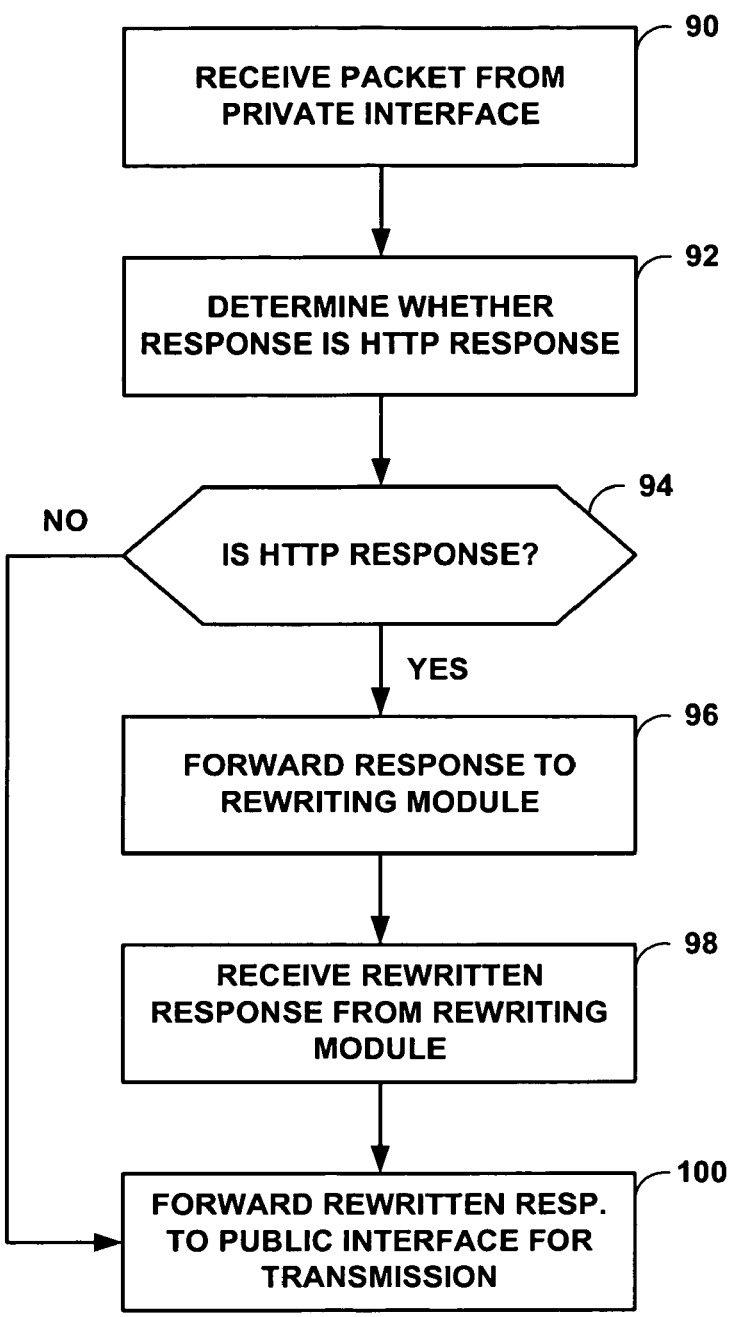
FIG. 5 is a flowchart illustrating an exemplary operation of an interface control module within a SSL VPN gateway device configured to facilitate directory browsing when the SSL VPN gateway device receives a network packet from a directory server.

FIG. 5 is a flowchart illustrating an exemplary operation of an interface control module within a SSL VPN gateway device when the SSL VPN gateway device receives a network packet from a directory server. For purposes of illustration, continuing reference is made to the previous figures.

Initially, interface control module 24 receives a network packet from private network interface 22 (90). Upon receiving the network packet, interface control module 24 determines whether the network packet is a last network packet of an HTTP response (92). If the network packet is not a last packet of an HTTP response ("NO" of 94), interface control module 24 buffers the network packet, forwards the network packet to another processing unit, or forwards the network packet to public network interface 20 for transmission to public network 10 (100). On the other hand, if the network packet is a last packet of an HTTP response ("YES" of 94), interface control module 24 sends the HTTP response to rewriting module 32 (96). Subsequently, interface control module 24 receives a rewritten HTTP response back from rewriting module 32 (98). In the rewritten HTTP response, UNC-formatted resource identifiers are disabled and scripts have been included to cause the web browser application to use the folder view graphical directory-browsing interface. After receiving the rewritten HTTP response, interface control module 24 forwards the rewritten HTTP response to public network interface 20 for transmission via public network 10 to client device 4A (100).

Figure 6:
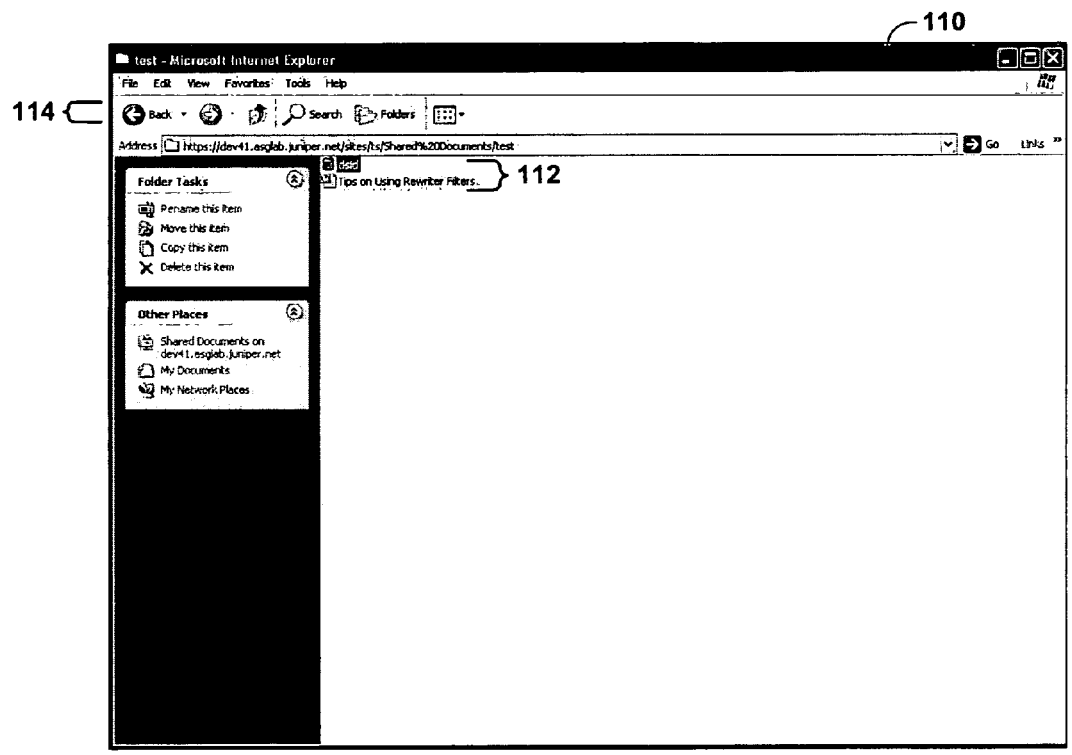
FIG. 6 is a screen illustration showing an exemplary graphical directory-browsing interface within a web browser application.

FIG. 6 is a screen illustration showing an exemplary directory browsing display within a web browser application. As illustrated in FIG. 6, a Microsoft® Internet Explorer window 110 displays files 112 located on a directory server. Note that a toolbar 114 within window 140 resembles a toolbar within directory browsing windows displayed by Microsoft Windows XP.

Various embodiments of the invention have been described. For example, several embodiments have been described wherein the web browser application sends the first request in the SMB protocol. However, the web browser application may send the first request in another protocol, such as the File Transfer Protocol (FTP). These and other embodiments are within the scope of the following claims.

The invention claimed is:

1. A method performed by an intermediate computer network device providing a secure virtual private network (VPN) connection between a client device and a directory server, the method comprising:
   intercepting, with the intermediate device, an original version of a web page output by the directory server and destined for the client via the VPN, wherein the original version of the web page contains an original resource identifier that identifies a directory structure provided by the directory server, and wherein the original resource identifier conforms to a format that causes the directory server to produce the directory structure in a first graphical, directory-browsing user interface that is incompatible with the VPN connection between the client device and the directory server;
   in response to the intercepted original resource identifier, rewriting the original version of the web page with the intermediate device to remove the original resource identifier and to include an altered resource identifier that identifies the same directory structure and the same directory server and instructions to cause the client device to output a request to the directory server to produce the directory structure in a second, graphical directory-browsing user interface that is compatible with the VPN connection between the client device and the directory server; and
   sending the rewritten web page from the intermediate device to the web browser application on the client device via the VPN connection.

2. The method of claim 1, wherein the original resource identifier conforms to a Universal Naming Convention (UNC) naming convention.

3. The method of claim 1, wherein intercepting the original version of the web page comprises intercepting a Hyper Text Transfer Protocol (HTTP) response containing the original version the of the web page.

4. The method of claim 1, wherein rewriting the original version of the web page to include instructions comprises adding instructions to the web page to add folder-viewing behavior to an element of the web page.

5. The method of claim 1, wherein sending the rewritten web page from the intermediate device comprises sending a web page that contains instructions to cause the web browser application to send the request conforming to a Hypertext Transfer Protocol (HTTP) via the secure VPN connection.

6. The method of claim 5, further comprising preventing requests not conforming to the Hypertext Transfer Protocol from reaching the directory server.

7. The method of claim 1, wherein the first graphical directory-browsing interface comprises a graphical directory-browsing interface used by an operating system of the client device to display directory structures that are local to the client device.

8. The method of claim 1, wherein a hostname portion of the request is a hostname of the intermediate network device.

9. The method of claim 8, further comprising:
   receiving, with the intermediate device, the request from the web browser application to display the directory structure in the second graphical directory-browsing interface;
   dynamically substituting, with the intermediate device, the hostname of the intermediate network device for a hostname of the directory server; and
   sending, with the intermediate device, the request with the hostname of the directory server to the directory server.

10. The method of claim 9, wherein substituting the hostname comprises:
    extracting, with the intermediate device, the hostname of the directory server from a cookie contained in the request; and
    rewriting, with the intermediate device, the request to substitute the hostname of the intermediate network device with the hostname of the directory server extracted from the cookie.

11. The method of claim 9, further comprising:
    applying an encoding scheme for mapping, with the intermediate device, between a hostname of the directory server and an encoded version of a hostname of the directory server; and
    wherein substituting the hostname comprises:
       determining the hostname of the directory server based on the mapping in response to receiving the request; and
       rewriting the request to substitute the hostname of the intermediate network device with the hostname of the directory server determined from the mapping.

12. The method of claim 11,
    wherein the hostname of the intermediate device is a server identifier concatenated with a dot "." concatenated with a hostname of the intermediate network device, and
    wherein the encoding scheme identifies both the original hostname and the backend software application.

13. The method of claim 11, wherein applying the encoding scheme comprises applying the encoding scheme to dynamically transform a Universal Naming Convention (UNC) directory link or a universal resource locator (URL).

14. A virtual private network (VPN) gateway device comprising:
    a plurality of network interfaces; and
    a hardware processor executing software instructions that cause the VPN gateway device to:
    (i) intercept an original version of a web page output by a directory server and destined for a client via the VPN, wherein the original version of the web page contains an original resource identifier that identifies a directory structure provided by the directory server, and wherein the original resource identifier conforms to a format that causes the directory server to output the directory structure in a first graphical, directory-browsing user interface that is incompatible with the VPN connection between the client device and the directory server;

(ii) in response to the intercepted original resource identifier, rewrite the original version of the web page with the VPN gateway device to remove the original resource identifier and to include an altered resource identifier that identifies the same directory structure and the same directory server and instructions to cause the client device to output a request to the directory server to produce the directory structure in a second, graphical directory-browsing user interface that is compatible with the VPN connection between the client device and the directory server, and (iii) send the rewritten web page from the VPN gateway device to the client device via the secure VPN connection.

15. The VPN gateway device of claim 14, wherein the original resource identifier conforms to a Universal Naming Convention (UNC) naming convention, and the altered resource identifier is a URL-formatted resource identifier.

16. An intermediate network device positioned on a network path between a client device and a directory server, the network device comprising:

a hardware processor;

a first network interface to send and receive network packets to and from the intermediate network device and the client device over a public network via a connection protected with transport layer security;

a second network interface to send and receive network packets to and from the intermediate network device and the directory server;

an interface control module executing on the hardware processor to identify a response from the directory server to a request by the client device to view a directory structure provided by the directory server, wherein the response contains an original resource identifier that, when used by a web browser application on the client device, causes the web browser application to send a request to view the directory structure in a first graphical directory-browsing user interface conforming to a protocol that is not permitted to pass through the intermediate network device; and a rewriting module to generate a rewritten response in which the original resource identifier has been removed and which includes, in place of the original resource identifier, a replacement resource identifier and instructions to cause the client device to output a request to view the directory structure as second graphical directory-browsing interface that conforms to a protocol that is permitted to pass through the intermediate network device.

\* \* \* \* \*

UNITED STATES PATENT AND TRADEMARK OFFICE
CERTIFICATE OF CORRECTION

| | | |
|---|---|---|
| PATENT NO. | : 7,840,996 B1 | Page 1 of 1 |
| APPLICATION NO. | : 11/498684 | |
| DATED | : November 23, 2010 | |
| INVENTOR(S) | : Wu | |

It is certified that error appears in the above-identified patent and that said Letters Patent is hereby corrected as shown below:

Column 13, Line 65, "the of the" should read --of the--

Signed and Sealed this
Tenth Day of January, 2012

David J. Kappos
*Director of the United States Patent and Trademark Office*